Patented May 23, 1944

2,349,768

UNITED STATES PATENT OFFICE 2,349,768

RESINOUS COMPOSITION AND PREPARATION OF THE SAME

Franklin Strain, Akron, Ohio, assignor to Pittsburgh Plate Glass Company, Allegheny County, Pa., a corporation of Pennsylvania No Drawing. Application February 18, 1939, Serial No. 257,133

1 Claim. (Cl. 260—83)

This invention relates to the preparation of fusible polymeric polyhydric alcohol esters of acrylic and the alpha-substituted acrylic acids and to the methods of rendering such polymers infusible. Prior to this invention, it has been recognized that certain methacrylic acid polyesters of polyhydric alcohols could be polymerized to form infusible, insoluble products. However, such polymers are difficult to handle because of their lack of reactivity. Since they can not be molded readily, the uses of these materials have been generally considered to be limited to those applications wherein cast polymerization processes are permissible.

In accordance with my invention, I have been able to polymerize monomeric, polyhydric alcohol polyesters of the acrylic and alpha-substituted acrylic acids, such as ethylene glycol dimethacrylate, ethylene glycol dichloracrylate, glycerol triacrylate, etc., under such conditions that a fusible polymer which is soluble in organic solvents may be secured. This product may then be molded to a convenient shape, or applied as a coating to a base material, and subsequently rendered infusible by further polymerization in a suitable manner, for example, by application of heat, light or other sources of energy with or without catalysts.

I have found that soluble, fusible polymers of the polyhydric alcohol polyesters of acrylic and alpha-substituted acrylic acids, such as ethylene glycol dimethacrylate, ethylene glycol dichloracrylate, glycerol di- or trichloracrylate, glycerol di- or trimethacrylate, etc., may be produced by polymerizing the monomeric ester under proper conditions. The fusible products may be produced, for example, by polymerization of the esters in solvents which are capable of dissolving the fusible polymer, and interrupting polymerization before the infusible insoluble polymer is formed. Other methods whereby polymerization of the one acrylate radical occurs without substantial interpolymerization of the other unsaturated ester radical may also be resorted to.

I have found that when the polyhydric acrylic or alpha-substituted acrylic esters herein discussed such as ethylene glycol dimethacrylate, are polymerized in solvents which are capable of dissolving the polymer, for example, acetone, dioxane, chloroform, etc., a soluble polymer is formed initially, but as polymerization proceeds, the insoluble polymer is produced and the solution is converted to a non-reversible gel. By interrupting polymerization in a suitable manner before the gel is formed, a soluble, fusible polymer may be secured and isolated. This fusible polymer is found to be soluble in a majority of the solvents in which the polymers of the saturated alkyl acrylates are normally soluble.

While the invention is particularly applicable to the polyesters of ethylene glycol and glycerol, the invention may be applied to polymers obtained from numerous other esters, such as the esters of polyglycols, for example the diethylene glycol, triethylene glycol, tetraethylene glycol, trimethylene glycol, tetramethylene glycol, decamethylene glycol, or other glycols such as 1,2 propylene glycol, or butylene glycol, or of other polyhydric alcohols such as the monoalkyl glycerols, alpha-methyl glycerol or alpha-ethyl glycerol or glycerol monochlorohydrin or the higher alcohols such as sorbitol or mannitol wherein at least two of the free hydroxyl groups have been esterified by acrylic or an alpha-substituted acrylic acid. Similarly mixed esters of these alcohols wherein at least one hydroxyl group is esterified with acrylic or alpha-substituted acrylic acid and at least one hydroxyl group is esterified with another unsaturated acid which contains a polymerizable group or groups such as crotonic, itaconic, cinnamic, propiolic etc., acids may be prepared and fusible polymers may be secured therefrom. Thus desirable polymers may be prepared from ethylene glycol mono-methacrylate-monocrotonate, glycerol monoacrylate dicrotonate, glycerol mono - methacrylate - mono - crotonate, and glycerol monoacrylic-dimethacrylate.

In general, it has been found that the solvents, in which polymers of the saturated esters of the acrylates or alpha-substituted acrylates, such as methyl methacrylate, methyl chloracrylate, etc., are soluble, should be used for polymerization. Thus, such solvents as acetone, dioxane, chloroform, toluene, benzene, carbon tetrachloride, methyl cellosolve acetate, phenyl cellosolve, dichlorethyl ether, xylene, tetralin, dibutyl phthalate, trichloroethylene, tetrachloroethane, etc., or mixtures of these solvents are found to be suitable. In addition, the saturated acrylic or alpha-substituted acrylic esters such as monomeric methyl, ethyl, propyl, etc., methacrylate, or chloracrylate, or other polymerizable materials, for example, "vinylic" compounds, such as styrene, vinyl chloride, vinyl acetate, etc., may be added to the above solution before polymerization in order to form copolymers. Such materials may be copolymerized in varying amounts but in general should not be in excess such that the polymer cannot be converted to the infusible state. In general, copolymers containing a preponderant quantity of the polyhydric polyester are suitable.

In each case, the polymerization should be interrupted before the infusible product is produced. This may be accomplished by stopping polymerization before gel formation is observed. In accordance with one illustrative method of interrupting polymerization, the polymer may be separated from the solvent by convenient methods, for example, by the addition of a compound in which acrylate polymers are normally insoluble, such as methyl or ethyl alcohol, petroleum ether, water, ethylene glycol, etc. This process permits the isolation of the fusible polymer of the polyhydric alcohol polyesters of acrylic and alpha-substituted acrylic in a substantially pure state.

Polymerization may also be halted by lowering the temperature of the reaction mixture to a suitable degree, for example, to room temperature or below. It has been found that although polymerization proceeds fairly rapidly at a temperature of 40° C., or above, the reaction rate increasing with increase of temperature, it proceeds at such a slow rate that it may be practically discontinued at a lower temperature. This is especially true when polymerization is carried out in solution.

In accordance with another effective method of interrupting polymerization, inhibitors, such as pyrogallol, hydroquinone, aniline, phenylene diamine, sulphur, thiophenol, organic or inorganic salts or complexes, of the reduced forms of metals such as copper, manganese, cobalt, nickel, etc., dipentene, etc., may be added to the polymer during polymerization or to the monomer before polymerization has been initiated. When a solution of the fusible polymer has then been secured, it may be treated to separate the polymer from the solvent by slow evaporation, treatment with a nonsolvent, or other suitable method and fusible cast thermoplastic polymers which may be machined, cut, bent or otherwise worked into desirable forms thereby obtained. After final shaping, the products may be completely hardened and rendered infusible by suitable methods hereinafter more fully set forth.

It has been found that the yield of fusible polymer appears to be dependent to a great extent upon the concentration of the monomer in the solution undergoing polymerization. Thus, when very concentrated solutions containing a large quantity, for example, in excess of 40–50 percent, of the monomeric ethylene glycol or glycerol dimethacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight, yields of the fusible polymer upward of 75 percent of the theoretical may be secured. Accordingly, it is preferred to deal with solutions having a monomer concentration below 40 percent by weight.

The yield of fusible polymer appears to be increased by treating the solution at increased temperatures and increased catalyst concentrations. Thus, substantially greater yields may be secured by polymerizing ethylene glycol dimethacrylate solutions at 100° C. or above than may be secured at 60° C. Catalyst concentrations up to 5 percent or more may be used in some cases. In general, conditions favoring the formation of lower molecular weight polymers appear to result in increased yields of fusible products.

The following examples illustrate the preparation of these fusible polymers:

Example I

One part by weight of ethylene glycol dimethacrylate was heated with 0.07 part by weight of benzoyl peroxide and 5.6 parts by weight of acetone under a reflux condition for one and one-half hours. The resulting solution was carefully poured, with stirring, into 100 parts of methanol. A white precipitate which was fusible and soluble in acetone was formed. When heated under slight pressure at 90° C. the material fused and rapidly converted to an insoluble and infusible form.

Example II 55 parts by weight of ethylene glycol dichloracrylate were heated with 3 parts by weight of benzoyl peroxide and 350 parts by weight of acetone at a temperature of 60° C. for one hour. At this time, 300 parts of methanol were added to produce turbidity and the resulting mixture was poured slowly, with stirring, into 1600 parts of methanol. The white voluminous precipitate thus formed was filtered and dried, and was soluble in acetone and chloroform. Upon heating, the polymer softened at 100° C. and rapidly converted into an infusible and insoluble transparent material.

Example III

One part by weight of glycerol dimethacrylate was heated with 0.07 part by weight of benzoyl peroxide and 5.6 parts by weight of acetone under a reflux condenser for one and one-half hours. The resulting solution was carefully poured, with stirring, into 100 parts of methanol. A white precipitate which was fusible and soluble in acetone was formed. This material began to soften when heated to 90° C., and was rapidly converted into a hard brittle product.

Example IV 55 parts by weight of glycerol triacrylate were heated with 3 parts by weight of benzoyl peroxide and 350 parts by weight of acetone at a temperature of 60° C. for 1 hour. At this time, 300 parts of methanol were added to produce turbidity, and the resulting mixture was poured slowly, with stirring, into 1600 parts of methanol. The white voluminous precipitate thus formed was filtered and dried, and was soluble in acetone and chloroform. Upon heating, the polymer softened at 80–85° C., and then became infusible and insoluble with further heating.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenyl cellosolve, etc., and soften upon heating. The exact softening points of the products are dependent to a great degree upon the temperature, catalyst concentration, and monomer concentration of the solution undergoing polymerization. In general, it is found that the chloracrylate esters soften at a temperature somewhat higher than the corresponding acrylic and methacrylic esters and at normal temperatures are somewhat harder and more dense. All of these products appear to be easily molded into convenient shapes.

In accordance with my invention, I have found that upon subjection of these polymers to heating at temperatures somewhat above the softening point thereof, for a sufficient period of time, they are converted into infusible, insoluble, transparent, hard and wear-resistant products. This conversion appears to occur in the absence of catalysts. It may be assisted, however, by the incorporation of usual polymerization catalysts, such as oxygen, ozone, air, and peroxides, such as hydrogen peroxide and benzoyl peroxide. By use of catalysts, it is found that the conversion of these products to the infusible state may be secured at lower temperatures. The application of superatmospheric pressure has been found to assist the transformation to the insoluble and infusible stage.

The properties of the products so produced are dependent to a degree upon the conditions under which they were rendered infusible. Thus, extremely hard somewhat brittle products may be prepared by effecting the treatment at relatively high temperatures or under high pressures. On the other hand, somewhat stronger, less brittle materials may be secured when the treatment is conducted under moderate pressures and temperatures sufficiently low to permit a slow conversion of the fusible polymer into its infusible stage through a period in which it is substantially completely molten.

By operation, in accordance with the present invention, it is thus possible to form a molded article from the fusible polymer such as the fusible polymeric glycol or glycerol polymethacrylates or polychloracrylates previously referred to, and therefore to render the molded product insoluble and infusible by heat. In this manner, I am able to prepare transparent, hard, infusible molded products which have many of the desirable properties of the conventionally known thermoplastic resins. By proper regulation of the pressure and temperature, the fusible polymer may be extruded under such conditions that it becomes infusible as it leaves the extrusion die.

A large number of inert substances may be incorporated with the fusible polymer before subjecting the molding condition. Suitable for such purposes are: fillers, such as wood-flour, mica, cotton flock, etc., plasticizers, such as dibutyl phthalate, dicyclohexyl phthalate, triacetine, tricresyl phosphate, natural and synthetic resins, pigments, including titanium dioxide, carbon black, chromic oxide, lead chromate, etc., and organic dyestuffs, such as methylene blue, methyl orange, etc.

If desired, similar products may be made from suitable copolymers of the olefinic esters of the acrylic or alpha-substituted acrylic acids, with the saturated esters of these acids such as the methyl and ethyl esters thereof. In some cases, it is found that infusible products which are stronger and less brittle than the single polymer may be produced in this manner. This is particularly true when the glycol, glycerol or other unsaturated polyester is polymerized with a monohydric alcohol ester, such as the methyl or ethyl ester of methacrylic or chloracrylic acid.

The polymers which I have prepared are capable of numerous uses, such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of the polyhydric alcohol polyester of acrylic or alpha-substituted acrylic acids such as glycol or glycerol dimethacrylate is deposited upon polymerized methyl methacrylate or similar polymer and the solvent removed, a coherent surface thereof is formed. Upon heating the coated article to suitable temperatures, this surface may be made transparent, hard and infusible.

Being of the thermosetting type, these resins do not exhibit the phenomenon of "cold flow," and are thus especially desirable for such uses as airplane windshields, where the pressure differences have been found to bow thermoplastic glass substitutes, particularly at the higher altitudes. Coating may also be applied to metal, glass, wood, synthetic resins, etc., surfaces by extrusion of the heated fusible polymer directly on the suitably-prepared surface. In similar manner, the surface may be heated and the polymer applied in powdered form, whereupon fusion occurs first to give a smooth, homogeneous film which may then be heat-hardened.

These resins are also suitable for many uses in the field of laminated products. For example, products of great strength, elasticity and adherence may be secured by converting fusible glycol, or glycerol polymethacrylate, polychloracrylate, etc., into the infusible state in the presence of a substantial amount of a compatible softening agent. Satisfactory non-shatterable glass sheets may be obtained by heating a combination of superposed sheets where the thermoplastic ethylene glycol dimethacrylate polymer and a softening agent such as dibutyl phthalate are used as the adhesive layer.

It has been found that these products are applicable for impregnation purposes. Thus, leather, paper, wood or other comparatively porous substances may be steeped in a solution of the fusible polymer of glycerol dimethacrylate, for example, and then heated alone, under pressure, or in the presence of catalysts to convert the absorbed polymer to the insoluble, infusible form. Greatly improved products, particularly in regard to strength, water-proofing, and electrical properties are obtained.

The following examples illustrate the conversion of the fusible resin into the infusible form:

*Example V*

Two parts of fusible ethylene glycol dimethacrylate polymer, prepared in accordance with Example I, was heated at 150° C., under a pressure of 5000 lbs. per sq. in. for one-half hour and a clear infusible insoluble sheet was produced.

*Example VI*

Two parts of fusible ethylene glycol dichloracrylate polymer, prepared as in Example II, was molded as in Example V at 140° C., under pressure of 2000 lbs. per sq. in. for one hour. The product obtained was hard, clear, and unaffected by solvents or heat to the point of pyrolytic decomposition.

*Example VII*

Two parts of the thermoplastic form of ethylene glycol diacrylate polymer was heated in a mold at 140° C., under a pressure of 3000 lbs. per sq. in. for one hour. The resulting product was hard, clear and unaffected by solvents or heat to the point of pyrolytic decomposition.

Example VIII

One part by weight of fusible glycerol dimethacrylate polymer was dissolved in 10 parts of acetone and the solution applied to the surface of a cast sheet of polymerized methyl methacrylate. Upon evaporation of the solvent a clear film was obtained. This product was heated at 140°–150° C., for one hour, and a material having a comparatively soft interior and a surface which was clear, transparent, hard, and resistant to the action of heat and solvents was produced.

The process may also be extended to the production of mixed polymers or copolymers. Thus, the fusible polymer prepared in accordance with my invention may be mixed with other monomers or polymers such as the monomer or polymer of methyl methacrylate, methyl chloracrylate, vinyl acetate, vinyl chloride, styrene, etc., and the mixture subjected to conditions of polymerization. Similarly, copolymers may be prepared by copolymerizing the monomeric polyhydric alcohol esters with numerous other polymerizable materials, such as the saturated acrylates or alpha-substituted acrylates, or vinyl esters, such as vinyl chloride or vinyl acetate or styrene. In general, it is preferred to maintain in excess of 25 percent of the polyester herein claimed in order to insure the production of a convertible resinous product.

When the term "polyacrylate, polymethacrylate, polychloracrylate, polyester, etc.," is employed in the specification or in the claims, it refers to the number of acid groups attached to the designated alcohol in contra-distinction to a polymerized ester.

Although the present invention has been described with reference to the specific details of certain embodiments thereof, it is not intended that such details shall be regarded as limitations upon the scope of the invention except insofar as included in the accompanying claims.

I claim:

The method of preparing a polymer of a polyhydric alcohol polyester of methacrylic acid which comprises treating said polyester to polymerize same, interrupting the polymerization after substantial polymerization has occurred but before the polymer has been converted into a gel, substantially completely separating residual monomer from the resulting fusible polymer, subjecting the fusible polymer to a temperature and pressure sufficient to insure the existence of the polymer in a fused state, and continuing polymerization of the fused polymer until the polymer is converted to the infusible state.

FRANKLIN STRAIN.